United States Patent [19]

Barclay

[11] Patent Number: 4,507,927
[45] Date of Patent: Apr. 2, 1985

[54] LOW-TEMPERATURE MAGNETIC REFRIGERATOR

[75] Inventor: John A. Barclay, Los Alamos, N. Mex.

[73] Assignee: The United States of America as represented by the United States Department of Energy, Washington, D.C.

[21] Appl. No.: 498,434

[22] Filed: May 26, 1983

[51] Int. Cl.$^3$ .............................................. F25B 5/00
[52] U.S. Cl. ............................................. 62/3; 62/6; 62/467
[58] Field of Search ................................ 62/3, 6, 467

[56] References Cited

U.S. PATENT DOCUMENTS

| | | | |
|---|---|---|---|
| 428,057 | 5/1890 | Tesla | 62/3 |
| 2,510,800 | 6/1950 | Chilowsky | 62/3 |
| 2,589,775 | 3/1952 | Chilowsky | 62/3 |
| 2,619,603 | 11/1952 | Chilowsky | 62/3 |
| 3,108,444 | 10/1963 | Kahn | 62/3 |
| 3,154,927 | 11/1964 | Simon | 62/3 |
| 3,393,526 | 7/1968 | Pearl | 62/3 |
| 3,413,814 | 12/1968 | Van Geuns | 62/3 |
| 3,774,404 | 11/1973 | Walker et al. | 62/3 |
| 3,841,107 | 10/1974 | Clark | 62/3 |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |
| 4,136,525 | 1/1979 | Van Vechten | 62/3 |
| 4,332,135 | 6/1982 | Barclay et al. | 62/3 |

OTHER PUBLICATIONS

G. V. Brown, "Magnetic Heat Pumping Near Room Temperature", J. Appl. Phys., 47, No. 8, 3673-3680, (8/1976).
J. A. Barclay, "A Reciprocating Magnetic Refrigerator for 2°-4° K. Operation: Initial Results", J. Appl. Physics., 50, No. 9, 5870-5877, (Sep. 1979).
J. A. Barclay, "Magnetic Refrigeration for Space Applications. Report on a Design Study," Los Alamos Scientific Laboratory Report LA-8134, (Feb. 1980).

Primary Examiner—Ronald C. Capossela
Attorney, Agent, or Firm—Lee W. Huffman; Paul D. Gaetjens; Judson R. Hightower

[57] ABSTRACT

The disclosure is directed to a low temperature 4 to 20 K. refrigeration apparatus and method utilizing a ring of magnetic material moving through a magnetic field. Heat exchange is accomplished in and out of the magnetic field to appropriately utilize the device to execute Carnot and Stirling cycles.

17 Claims, 3 Drawing Figures

LOW-TEMPERATURE MAGNETIC REFRIGERATOR

This invention is the result of a contract with the Department of Energy (Contract No. W-7405-ENG-36).

BACKGROUND OF THE INVENTION

The invention relates to magnetic refrigeration and more particularly to low temperature refrigeration between about 4 and about 20 K., with an apparatus and method utilizing a belt of magnetic material passed in and out of a magnetic field with heat exchangers within and outside the field operably disposed to accomplish refrigeration.

Magnetic refrigerators such as disclosed in U.S. Pat. No. 4,332,135 to Barclay et al. approximating cycles such as Brayton, Carnot, Ericsson, and Stirling cycles are known. Such magnetic refrigerators generally utilize paramagnetic or ferromagnetic material and move it in and out of a magnetic field to magnetize and demagnetize it in some manner. Materials capable of use in such refrigerators are disclosed in the '135 patent; many such magnetic refrigeration devices are operable over wide temperature ranges by staging a plurality of materials. Wheel type magnetic refrigerators such as disclosed in U.S. Pat. No. 4,408,463, to Barclay are also known. Wheel-type refrigerators are operable over various temperature ranges utilizing magnetic materials such as disclosed in the '135 patent.

There is, however, an existing need for an efficient refrigeration apparatus and method to refrigerate from about 20 to about 4 K. The instant invention provides an apparatus and method capable of efficiently refrigerating over this temperature range.

One object of the present invention is to refrigerate over a range of from about 20 to about 4 K.

Another object of the present invention is to provide highly efficient refrigeration.

One advantage of the instant invention is that an apparatus in accordance therewith requires little or no maintenance for extended periods of time because it is simple in design, has few moving parts and does not require periodic lubrication or adjustments.

Another advantage of the instant invention is that an apparatus in accordance therewith can be operated at various speeds to accomodate various refrigeration loads.

SUMMARY OF THE INVENTION

In accordance with the present invention there is provided an apparatus and method for refrigeration from about 20 to about 4 K. The apparatus comprises a magnetic field producing structure such as a U-shaped housing having a base and two arms, the arms comprising superconducting electromagnets spaced opposed to one another. A length of magnetic material such as a circular ring or belt is run in and out of the magnetic field. Heat exchange between the magnetic material and a heat transfer fluid such as helium gas is accomplished within and out of the field, respectively, to approximate Carnot and Stirling cycle refrigeration. The heat transfer fluid that passes through the material in the field is passed through an external heat exchanger near 20 K. to reject the heat of magnetization into an appropriate sink. The heat transfer fluid that passes through the material out of the field is passed through an external heat exchanger near 4 K. to absorb the thermal load. In the preferred embodiment the magnetic material is contained in a hermetically sealed container which comprises a wheel-shaped part and a rotatable driveshaft enclosing a drivepost perpendicular thereto at the center thereof. The wheel-shaped part comprises a rotatable rim portion containing a ring of fluid-contactable magnetic material. The driveshaft and the ring are operably connected and are substantially frictionlessly rotatable within the container, the driveshaft being affixed by, for example, a plate to the ring of magnetic material so that as the driveshaft is driven, the ring of magnetic material rotates within the container. The driveshaft is driven at a selected speed by, for example, an electric motor through a magnetic coupling. In the preferred embodiment, the ring of magnetic material comprises a porous magnetic material and the heat exchange is accomplished by first and second fluids which pass through the magnetic material at locations within and outside the magnetic field. In the preferred embodiment the U-shaped housing contains liquid helium which cools the housing and the superconducting electromagnets.

In the preferred embodiment the magnetic ring comprises porous material through which the heat exchange fluids can readily flow and the ring is radially partitioned in order to control, substantially reduce or eliminate circumferential flow of the fluid.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT

Figure 1:
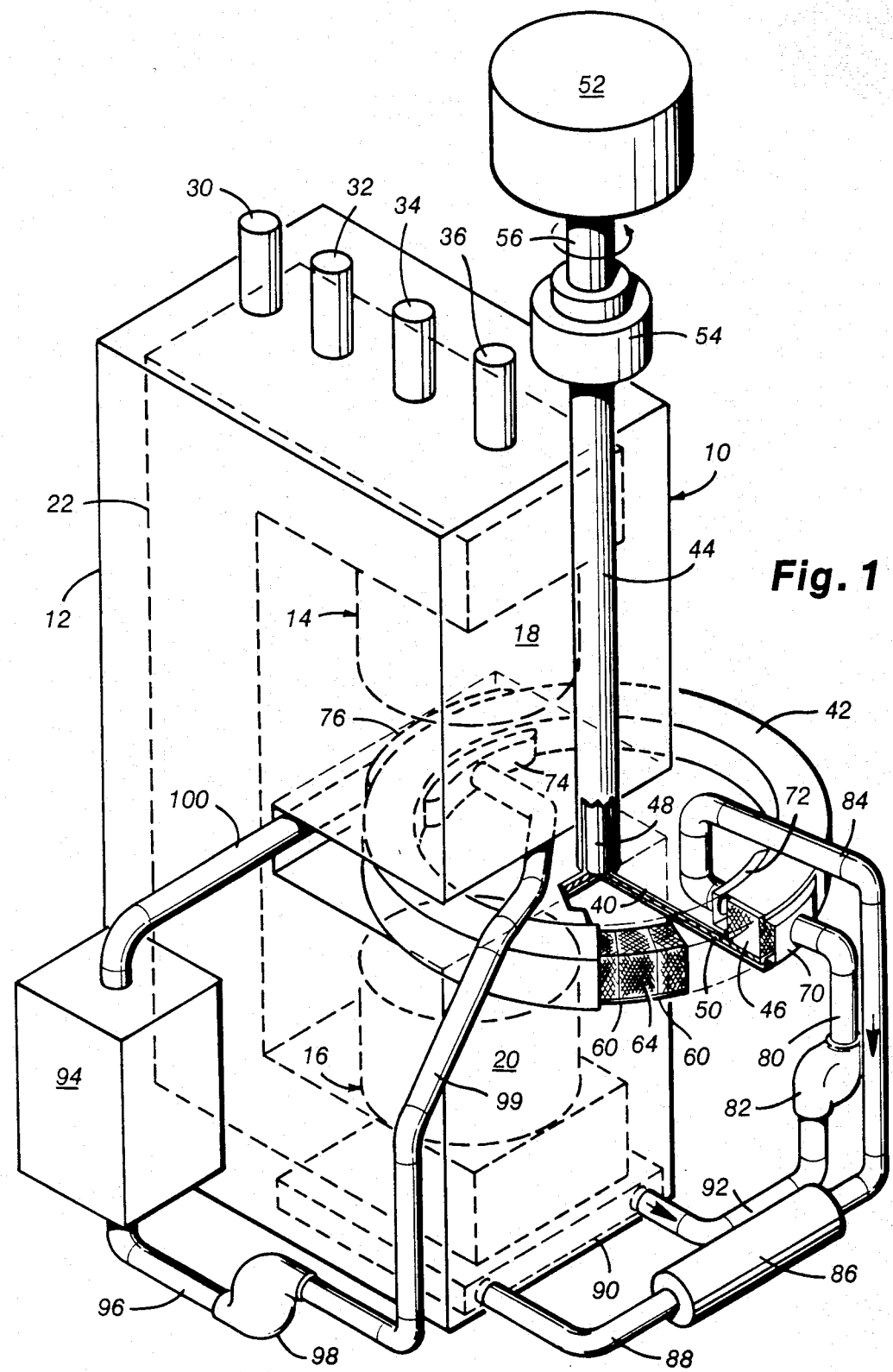
FIG. 1 perspectively illustrates a preferred embodiment of the invention.
Figure 2:
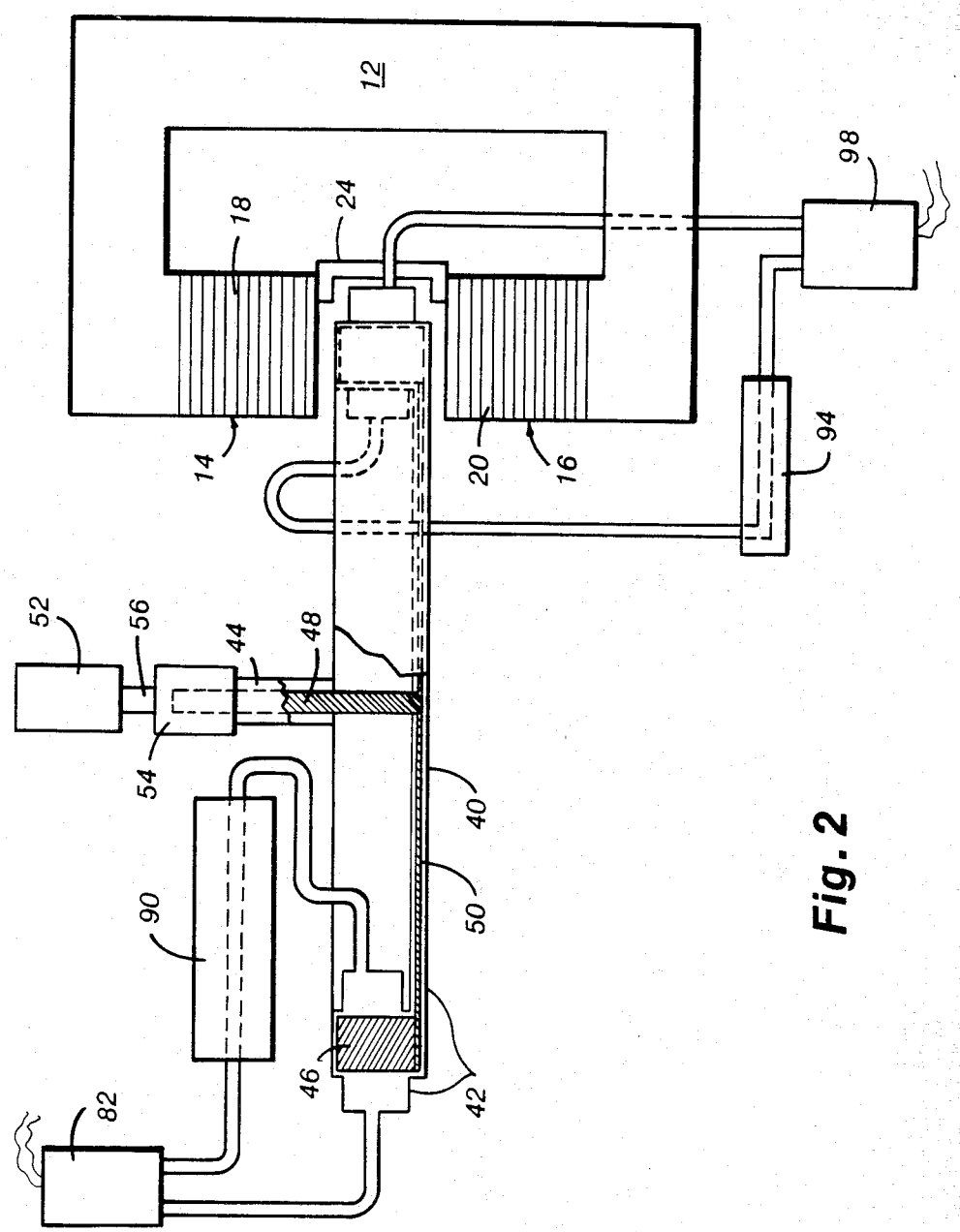
FIG. 2 is a partially schematic cross-sectional view of the preferred embodiment of FIG. 1.

Reference is now made to FIG. 1 which shows a preferred embodiment of the invention 10 comprising a U-shaped container 12 having arms in which are disposed superconducting magnets 14 and 16 comprised of iron cores and superconducting coils 18 and 20. The magnets 14 and 16 of the preferred embodiment produce a 5 to 7 tesla field in the gap across the U-shaped container in which a wheel-shaped part hereinafter to be described rotates. Iron cores in the magnets contribute about 2 tesla to the field when they are saturated by the superconductive windings of coils 18 and 20. The rest of the magnetic field comes from windings on either side of the gap. An additional feature of the magnet is the return path for the magnetic flux provided by an iron yoke 22 which also supports the two coils and gives a large thermal mass to the magnetic system. The magnet is designed to operate in persistent mode once it is fully charged and energized. Its leads may be removed to reduce heat leak into the container's liquid helium coolant. An extra support 24 as shown in FIG. 2 can be used against the large attractive magnetic forces.

Container 12 in the preferred embodiment comprises a Dewar that is closely fitted in the gap area but with adequate space for liquid helium flow elsewhere. Dewar 12 may be single walled if it is disposed in a large evacuated chamber. Preferably, superinsulation encapsulates the Dewar to reduce heat leaks into the liquid helium by radiation from the walls of the larger chamber surrounding it. Fill, exhaust, lead and instrumentation ports 30, 32, 34, and 36 are disposed atop Dewar 12.

A hermetically sealed container 40 comprising a wheeled shaped part 42 and a drive post shield 44 is positioned so that drive post shield 44 aligns parallel with magnets 14 and 16 and wheel-shaped part 42 is inserted into the gap between the magnets but does not touch the Dewar walls. A rotatable ring of magnetic material 46 within the wheel-shaped part of the stationary hermetic container 42 passes through the magnetic field produced by the magnets. Drive post shield 44 is supported from the Dewar which is not shown for drawing clarity. In the preferred embodiment, magnetic ring 46 attaches through a circular stainless steel plate 50 to a driveshaft 48 both of which essentially frictionlessly rotate within container 40. Driveshaft 48 is aligned and supported by a bearing in the magnetic drive housing 54. Container 40 which comprises both the wheel shaped portion 42 and the drive post shield 44 is stationary with reference to container 12 and the magnets. A variable speed motor 52 through a magnetic drive 54 well known to those skilled in the art rotates driveshaft 48 to turn circular plate 50 and therethrough ring 46 at a speed selected by a user.

Motor 52 may comprise a highly efficient direct current brushless permanent magnet motor or a linear induction drive motor operating at a low frequency, i.e., about 1 Hz. A driveshaft 56 extending from motor 52 couples to driveshaft 48 through the magnetic drive 54.

In the preferred embodiment rim 46 is preferably segmented by partitions 60 to provide chambers filled with crystals of magnetic material such as gadolinium gallium garnet (GGG), the individual pieces of magnetic material being approximately 0.5 millimeter in diameter. The inside and outside faces of the rim are sealed with 100 mesh stainless steel screen 64 to contain the GGG crystals and to allow easy passage for fluids from heat exchangers. The crystals of the preferred embodiment are selected to be of an appropriate size to provide good heat transfer between the heat exchange fluids and the magnetic material while allowing a small pressure drop or viscous loss and small radial heat conduction. Partitions 60 inhibit circumferential fluid flow through the magnetic material and guarantee essentially radial fluid flow through the GGG. Hermetic container 40 covers the wheel with very close tolerances so that gas does not meaningfully move between the wheel-shaped container and the rim 46 or plate 50. Container 40 is supported partially by the rim 46 and partially by fluid ducts 70, 72, 74, and 76 which hermetically connect to the housing. The fluid ducts control radial passage of fluid through the porous magnetic material at two locations. One, 74, 76 is inside the magnetic field where the material is magnetized and "hot", about 20 K. The other, 70, 72 is disposed where the material is demagnetized and "cold", about 4.2 K. The position of the ducts is determined by the entropy-temperature diagram of the device, the desired end point temperatures and the field profile of the magnet. Duct 70 outside the magnet is fed by a conduit 80 through which fluid is pumped by a pump 82. The fluid pumped by pump 82 passes through conduit 80 through the porous material of the ring 46 out through a conduit 84, through a cold heat exchanger 86, through a conduit 88 into a cold load 90, and back through a conduit 92 to pump 82.

Within the magnetic field, fluid from heat exchanger 94 is moved through a conduit 96 by a pump 98, through a conduit 99 and duct 74, the porous magnetic material of the rim 46, out through duct 76 and through a conduit 100 back to heat exchanger 94.

It will be appreciated by those skilled at the art that the preferred embodment utilizing a rim of porous magnetic material is highly efficient. Maximum efficiency is obtained by maximum surface area of the magnetic material being exposed to fluid flow. The material alternatively could be solid and in contact with heat exchange devices. The magnetic material could comprise a solid having radial holes drilled through it, be sintered, comprise radially disposed cylinders of material or other configurations such as radially disposed solid or composite plates, honeycomb material and the like. The invention is not limited to a particular form of magnetic material and the utilization of various types, sizes and shapes of magnetic material is contemplated.

The fluid flow path in each duct region need not be radial but could be along a section of the wheel if parallel plate geometry is used. The circumferential flow of fluid could be controlled in this geometry by a set of stationary non-magnetic plates interposed between the moving plates of magnetic material at each end of the duct section. A close tolerance between the two sets of plates would control the fluid leakage.

Two pumps are provided for Carnot cycle operation and are low temperature pumps particularly designed as positive displacement, low hydraulic head pumps having reasonable volume throughput. Low hydraulic head means that small pressure differences between output and input are provided. Linear induction drive using low frequency on the order of 1 Hz and permanent magnets can be used to efficiently drive the pumps. In each pump, the seals are clearance seals and the mass of the pump's piston is made into a resonant system by using a spring. Each pump is part of the hermetic container 40 that encloses the magnetic wheel. Hence, seal leaks through low temperature seals are not a problem. Pump 98 circulates helium gas in the preferred embodiment at near 20 K. through a liquid hydrogen pot 94 to reject heat and pump 82 circulates helium gas at near 4.2 K. through a load 90 in the Dewar to absorb heat from the surroundings into the Dewar and then through another load 86 and eventually to deposit the heat in the magnetic material of the ring 46. In the preferred embodiment pumps 82 and 98 are highly efficient and reliable and require no maintenance for extended periods of time.

External heat exchangers 86 and 94 are preferably utilized. The liquid hydrogen exchanger 94 in the preferred embodiment comprises an approximately 2 meters long coil of copper tubing having a ⅜ inch outside diameter. This length of tubing disposed in a pot of liquid hydrogen provides excellent heat exchange by boiling some liquid hydrogen as the helium gas passes through the coil. The cold heat exchanger 86 can be of the same design or of a similar design depending on the shape of the load.

Figure 3:
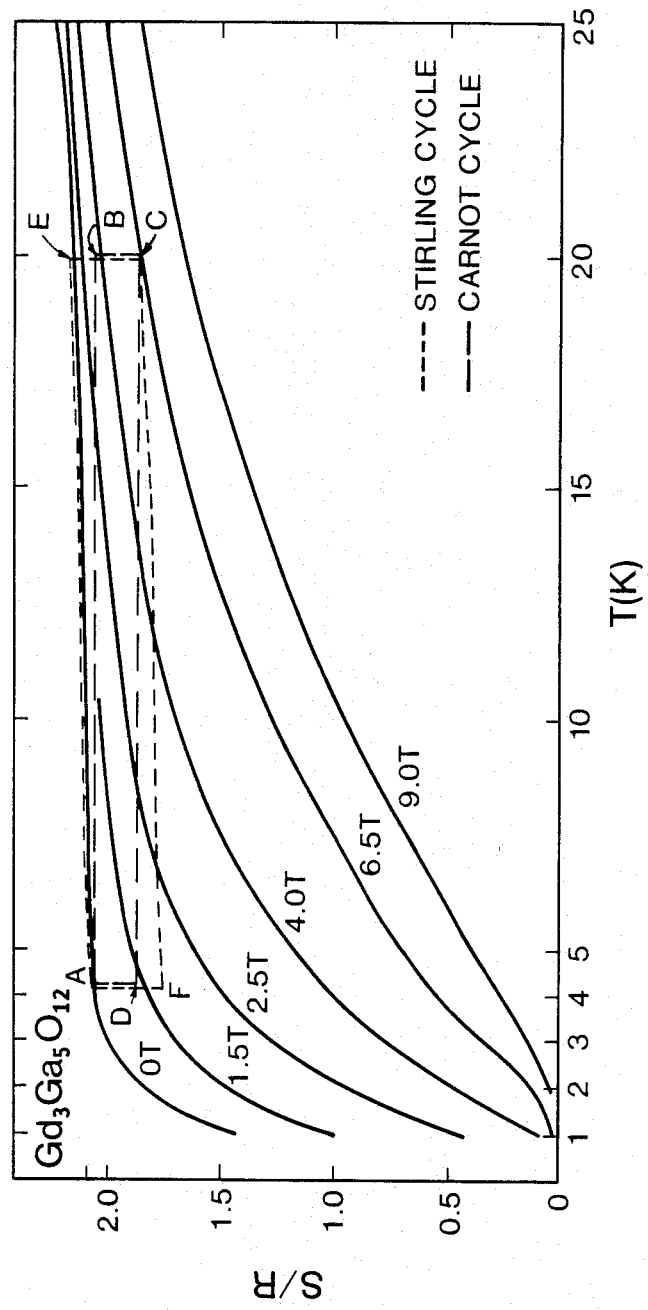
FIG. 3 graphically depicts Stirling and Carnot cycles achievable utilizing the preferred embodiment of the invention with a ring of magnetic material comprising $Gd_3Ga_5O_{12}$.

Reference is now made to FIG. 3 which is an entropy temperature (S-T) diagram. The points A, B, C, D illustrate operation of the device over a Carnot cycle whereas points A, E, C, F illustrate operation of the device over a Stirling cycle. Consider a small segment of the wheel rim 46 in the zero field which is in reality a low field region outside of the magnet and out of the low temperature duct corresponding to position A on the S-T diagram of FIG. 3. As segment 46 rotates into the magnet the field thereon increases slowly to cause a rapid increase in temperature to about 20 K. corresponding to point B on the S-T diagram. At this point the segment arrives at the duct 74, 76 and helium gas flows through the segment while it rotates to the maximum field point, thereby causing an approximately isothermal magnetization at about 20 K. corresponding to point C in FIG. 3. The segment then leaves the high temperature duct region and rotates out of the high field region its temperature thereby reducing to about 4.2 K. corresponding to point D in FIG. 3. The segment then enters the low temperature duct region 70, 72 and gas flows through it while the segment rotates to about zero field for an isothermal demagnetization. The segment leaves the low temperature duct region as it reaches the zero field which corresponds to point A on the S-T diagram to complete a Carnot cycle.

A Stirling cycle can be executed utilizing some regeneration. The best regenerator in the 4 to 20 K. temperature range is helium gas and a way to execute the cycle is to cause a small amount of helium gas to flow counter to wheel rotation. This may be accomplished by connecting a small bypass valve to the gas line coming from liquid hydrogen heat exchanger 94 at 20 K. This gas is caused to circulate around the wheel as it executes the isomagnetization stage of the cycle which is A to E on the S-T diagram. The counterflowing regenerative gas is cooled as it moves around the wheel. When it reaches about 4.2 K. it is piped to the other side of the low temperature duct 70, 72, where it then flows through the wheel back towards the magnet thereby regenerating the magnetic material coming out of the magnet at step C to F in FIG. 3. Those skilled in the art will appreciate that the porosity of the magnetic material can be controlled so that substantial flow occurs radially and small flow occurs circumferentially to accomplish this regeneration. This can be done by not segmenting a radially drilled solid magnetic ring which may have, for example, a plurality of circumferentially cut grooves in its upper and lower surfaces. Alternatively, partitions may contain small apertures so that some small amount of circumferential gas flow occurs. When the regenerative gas returns to about 20 K. it returns to the low pressure side of the high temperature gas circuit i.e., the circuit from heat exchanger 94. A flow control valve corresponding to the bypass valve can be controlled from a room temperature position so the cycle can be adjusted from a Carnot cycle which utilizes no regeneration to a Stirling cycle at a user's option. This capability provides an additional cooling power control.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An about 4 to about 20 K. refrigeration apparatus comprising:
    a generally U-shaped housing having a base and two arms, said housing comprising electromagnets on the insides of the tips of the arms, said electromagnets being spaced opposed to one another;
    a hermetically sealed container, said container comprising a wheel-shaped part and a rotatable driveshaft enclosing drive post shield perpendicular thereto at the center thereof, said wheel-shaped part comprising a rotatable rim portion, said rim portion containing a ring of fluid contactable magnetic material disposed therein, said driveshaft and said ring being substantially frictionlessly rotatable within said container;
    means for affixing said driveshaft within said drive post shield to said ring of magnetic material;
    means for rotating said driveshaft and thereby rotating said ring of magnetic material at a selected speed;
    first means for heat exchange comprising means for contacting a first fluid with a first portion of said ring of magnetic material disposed substantially outside a magnetic field produced by said electromagnets; and
    second means for heat exchange comprising means for contacting a second fluid with a second portion of said ring of magnetic material disposed inside said magnetic field.

2. The invention of claim 1 wherein said driveshaft rotating means comprises means for magnetically driving said driveshaft.

3. The invention of claim 1 wherein said driveshaft to ring affixing means comprises a substantially circular plate secured essentially at its center to said driveshaft and secured outwardly therefrom to said ring of magnetic material.

4. The invention of claim 1 wherein said magnetic material comprises $Gd_3Ga_5O_{12}$.

5. The invention of claim 1 comprising means for operating said first and second heat exchange means to substantially achieve Carnot cycle refrigeration.

6. The invention of claim 1 comprising means for operating said first and second heat exchange means to substantially achieve Stirling cycle refrigeration.

7. The invention of claim 1 wherein said U-shaped housing comprises means for conducting liquid coolant therethrough at superconductive temperatures to cool said housing and thereby said electromagnets therein.

8. The invention of claim 1 wherein said second heat exchange means comprises means for containing helium gas and for pumping helium gas to contact a portion of said ring of magnetic material disposed within said magnetic field.

9. The invention of claim 1 wherein said first heat exchange means comprises means for containing and pumping hydrogen to contact a portion of said ring of magnetic material disposed substantially outside said magnetic field.

10. The invention of claim 1 wherein said first and second heat exchange means comprise first and second means for pumping said fluid substantially radially with respect to said ring of magnetic material.

11. The invention of claim 10 wherein said ring of magnetic material is radially porous and substantially circumferentially fluid flow resistant.

12. The invention of claim 1 wherein said ring of magnetic material is porous.

13. The invention of claim 12 wherein said ring of porous magnetic material is radially segmented to substantially eliminate circumferential fluid flow therein.

14. The invention of claim 12 wherein said ring of porous material is radially segmented with aperture containing plates to provide some circumferential fluid flow through said plates.

15. The invention of claim 12 wherein said ring of porous material is radially segmented with plates smaller in cross sectional area than is said ring of material to provide some circumferential fluid flow past said plates.

16. The invention of claim 1 wherein said ring of magnetic material is substantially rectangular in cross-section.

17. The invention of claim 1 wherein said wheel-shaped container comprises stainless steel.

* * * * *